United States Patent
Tripathi et al.

(10) Patent No.: US 11,550,825 B2
(45) Date of Patent: Jan. 10, 2023

(54) SYSTEM AND METHOD FOR IDENTIFYING AT LEAST ONE ASSOCIATION OF ENTITY

(71) Applicant: Innoplexus AG, Eschborn (DE)

(72) Inventors: Gaurav Tripathi, Pune (IN); Vatsal Agarwal, Rampur (IN); Nikhil Vinod Fulzele, Nagpur (IN)

(73) Assignee: Innoplexus AG, Eschborn (DE)

( * ) Notice: Subject to any disclaimer, the term of this patent is extended or adjusted under 35 U.S.C. 154(b) by 126 days.

(21) Appl. No.: 16/366,307

(22) Filed: Mar. 27, 2019

(65) Prior Publication Data

US 2020/0089692 A1 Mar. 19, 2020

(30) Foreign Application Priority Data

Mar. 27, 2018 (GB) .................................. 1804895

(51) Int. Cl.
| | |
|---|---|
| *G06F 16/28* | (2019.01) |
| *G06F 16/951* | (2019.01) |
| *G06F 40/295* | (2020.01) |
| *G06F 40/30* | (2020.01) |
| *G06F 16/907* | (2019.01) |
| *G06F 16/9536* | (2019.01) |
| *G06F 16/29* | (2019.01) |

(52) U.S. Cl.
CPC ............ *G06F 16/288* (2019.01); *G06F 16/29* (2019.01); *G06F 16/907* (2019.01); *G06F 16/951* (2019.01); *G06F 16/9536* (2019.01); *G06F 40/295* (2020.01); *G06F 40/30* (2020.01)

(58) Field of Classification Search
CPC .. G06F 16/288; G06F 16/951; G06F 16/9536; G06F 16/29; G06F 40/295; G06F 40/30; G06F 16/95; G06F 16/3346; G06F 16/907
See application file for complete search history.

(56) References Cited

U.S. PATENT DOCUMENTS

| | | | |
|---|---|---|---|
| 10,319,042 B2 * | 6/2019 | Arvapally | .............. G06Q 40/12 |
| 2009/0119268 A1 * | 5/2009 | Bandaru | ............ G06Q 10/0631 |
| | | | 705/7.12 |
| 2015/0032738 A1 * | 1/2015 | Nachnani | ................ G06F 16/35 |
| | | | 707/723 |
| 2015/0149383 A1 * | 5/2015 | Tang | ....................... G06F 16/35 |
| | | | 705/347 |

(Continued)

*Primary Examiner* — Charles D Adams
(74) *Attorney, Agent, or Firm* — Ziegler IP Law Group, LLC (57) ABSTRACT

A system and method for identifying at least one association of an entity. The system includes a processing module and a database arrangement communicably coupled to processing module. The processing module is operable to receive an input comprising data related to the entity; acquire web content related to the received input from a plurality of data sources; filter the acquired web content to obtain information relating to the entity; identify probable associations of the entity from the information relating to the entity using an ontology; determine for each of the probable associations, at least one of: a recency attribute, a frequency attribute, a proximity attribute, a semantics attribute; determine a probability score for each of the probable associations of the entity; and identify the at least one association of the entity from the probable associations, wherein the at least one association corresponds to a highest probability score.

15 Claims, 2 Drawing Sheets

(56) References Cited

U.S. PATENT DOCUMENTS

2016/0140446 A1* 5/2016 Adderly ............... G06N 5/022
                                                    706/51
2017/0154314 A1* 6/2017 Mones ................ G06N 20/00
2017/0308807 A1* 10/2017 Hauth .............. G06F 16/24578
2018/0039695 A1* 2/2018 Chalabi ............... G06N 5/022

* cited by examiner

SYSTEM AND METHOD FOR IDENTIFYING AT LEAST ONE ASSOCIATION OF ENTITY

CROSS-REFERENCE TO RELATED APPLICATIONS

This application claims the benefit under 35 U.S.C. § 119(a) and 37 CFR § 1.55 to UK Patent Application No. GB1804895.9, filed on Mar. 27, 2018, the entire content of which is incorporated herein by reference.

TECHNICAL FIELD

The present disclosure relates generally to searching and data retrieval; and more specifically, to systems that identifies at least one association of an entity. Furthermore, the present disclosure relates to methods for identifying at least one association of an entity. Moreover, the present disclosure also relates to computer readable medium containing program instructions for execution on a computer system, which when executed by a computer, cause the computer to perform method steps of identifying at least one association of the entity.

BACKGROUND

With increasing advancements in technology, nearly half of world's population uses Internet® today for day-to-day activities. Owing to its wide range of applications, Internet® can be used in various fields like marketing, research, innovation and so forth. Moreover, one of the key applications of the Internet® includes search and retrieving information related to an entity, such as a person or an organization. Conventionally, retrieving such information has been a challenge due to an ever increasing volume of data on the Internet®. For example, retrieving information about a doctor named "Dr John" specializing in a "Cardiology" may be a difficult task as there might be hundreds of doctors having the same name and specialization.

However, with the advent of new technologies such as large scale crawling and data mining, this problem has been greatly reduced. Specifically, data mining is used extensively to sort through large and unstructured data sets to identify patterns and establish relationships to solve problems through analysis of large amounts of data quickly and efficiently. Similarly, large-scale crawling is used to examine the data available on the Internet® to efficiently retrieve required information. Furthermore, such large scale crawling is performed using crawler for scanning the Internet® to search for the data associated with a search query and store it in an index. Subsequent to creation of such index, the data associated with the search query can be displayed to user.

Furthermore, techniques such as large scale crawling and data mining may involve several challenges while retrieving information related to a search. Specifically, the data retrieved by the crawler may not be up-to-date or relevant to the user. Moreover, the crawler may retrieve a very high amount of data, which the user may have to sift through to find relevant information. Additionally, the entity may have updated information related thereto only on one particular data source. Consequently, the crawler may come across different information on different data sources. In addition, information related to the entity may be obtained by manually inquiring from data sources known to be associated with the entity. However, such process of manual inquiry is time-consuming and labour-intensive.

Therefore, in light of the foregoing discussion, there exists a need to overcome the aforementioned drawbacks associated with the conventional techniques of retrieving information related to an entity.

SUMMARY

The present disclosure seeks to provide a system that identifies at least one association of an entity. The present disclosure also seeks to provide a method of identifying at least one association of an entity. The present disclosure also seeks to provide a computer readable medium, containing program instructions for execution on a computer system, which when executed by a computer, cause the computer to perform method steps for identifying at least one association of an entity. The present disclosure seeks to provide a solution to the existing problem of retrieval of outdated and unverified data in response to a search. An aim of the present disclosure is to provide a solution that overcomes at least partially the problems encountered in prior art, and provides a reliable and time-efficient method of identifying data related to an entity.

In one aspect, an embodiment of the present disclosure provides a system that identifies at least one association of an entity, wherein the system includes a computer system, wherein in that the system comprises:
    a processing module operable to:
        a) receive an input comprising data related to the entity;
        b) acquire web content related to the received input from a plurality of data sources;
        c) filter the acquired web content to obtain information relating to the entity;
        d) identify probable associations of the entity from the information relating to the entity using an ontology;
        e) determine for each of the probable associations, at least one of: a recency attribute, a frequency attribute, a proximity attribute, a semantics attribute;
        f) determine a probability score for each of the probable associations of the entity, based on at least one of: the recency attribute, the frequency attribute, the proximity attribute, the semantics attribute; and
        g) identify the at least one association of the entity from the probable associations, wherein the at least one association corresponds to a highest probability score; and
    a database arrangement communicably coupled to the processing module, wherein the database arrangement is operable to store the data related to the entity, the probability score of each of the probable associations of the entity, and the at least one association of the entity.

In another aspect, an embodiment of the present disclosure provides a method of identifying at least one association of an entity, wherein the method includes using a computer system, wherein the method comprises:
    a) receiving an input comprising data related to the entity;
    b) acquiring web content related to the received input from a plurality of data sources;
    c) filtering the acquired web content to obtain information relating to the entity;
    d) identifying probable associations of the entity from the information relating to the entity using an ontology;
    e) determining for each of the probable associations, at least one of: a recency attribute, a frequency attribute, a proximity attribute, a semantics attribute;
    f) determining a probability score for each of the probable associations of the entity, based on at least one of: the recency attribute, the frequency attribute, the proximity attribute, the semantics attribute; and g) identifying the at least one association of the entity from the probable associations, wherein the at least one association corresponds to a highest probability score.

In yet another aspect, an embodiment of the present disclosure provides a computer readable medium containing program instructions for execution on a computer system, which when executed by a computer, cause the computer to perform method steps for identifying at least one association of an entity, the method comprising the steps of:

a) receiving an input comprising data related to the entity;

b) acquiring web content related to the received input from a plurality of data sources;

c) filtering the acquired web content to obtain information relating to the entity;

d) identifying probable associations of the entity from the information relating to the entity using an ontology;

e) determining for each of the probable associations, at least one of: a recency attribute, a frequency attribute, a proximity attribute, a semantics attribute;

f) determining a probability score for each of the probable associations of the entity, based on at least one of: the recency attribute, the frequency attribute, the proximity attribute, the semantics attribute; and g) identifying the at least one association of the entity from the probable associations, wherein the at least one association corresponds to a highest probability score.

Embodiments of the present disclosure substantially eliminate or at least partially address the aforementioned problems in the prior art, and enables retrieval of contextually relevant, updated and validated data related to a search.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

In overview, embodiments of the present disclosure are concerned with identifying association of an entity and specifically to, providing validated associations of the entity, wherein the association are determined based on at least one of: recency, frequency, proximity and semantics thereof.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system that identifies at least one association of an entity, wherein the system includes a computer system, wherein the system comprises:

a processing module operable to:

a) receive an input comprising data related to the entity;

b) acquire web content related to the received input from a plurality of data sources;

c) filter the acquired web content to obtain information relating to the entity;

d) identify probable associations of the entity from the information relating to the entity using an ontology;

e) determine for each of the probable associations, at least one of: a recency attribute, a frequency attribute, a proximity attribute, a semantics attribute;

f) determine a probability score for each of the probable associations of the entity, based on at least one of: the recency attribute, the frequency attribute, the proximity attribute, the semantics attribute; and g) identify the at least one association of the entity from the probable associations, wherein the at least one association corresponds to a highest probability score; and a database arrangement communicably coupled to the processing module, wherein the database arrangement is operable to store the data related to the entity, the probability score of each of the probable associations of the entity, and the at least one association of the entity.

In another aspect, an embodiment of the present disclosure provides a method of identifying at least one association of an entity, wherein the method includes using a computer system, characterized in that the method comprises:

a) receiving an input comprising data related to the entity;

b) acquiring web content related to the received input from a plurality of data sources;

c) filtering the acquired web content to obtain information relating to the entity;

d) identifying probable associations of the entity from the information relating to the entity using an ontology;

e) determining for each of the probable associations, at least one of: a recency attribute, a frequency attribute, a proximity attribute, a semantics attribute;

f) determining a probability score for each of the probable associations of the entity, based on at least one of: the recency attribute, the frequency attribute, the proximity attribute, the semantics attribute; and g) identifying the at least one association of the entity from the probable associations, wherein the at least one association corresponds to a highest probability score.

The present disclosure provides a system and a method for identifying an at least one association of an entity and enables retrieval of contextually relevant, updated and verified associations of the entity. Furthermore, the method eliminates redundant or repetitive information such as advertisements in the form of boilerplates, thereby further improving the quality of the search result. Beneficially, the method and system may be used for generation of a profile of an entity, wherein the profile comprises a specialty of the entity, a geographical location of the entity, years of experience and other information such as rating, comments, news mention and participation in congresses and so forth. Furthermore, the method and system of the present disclosure analyze time of the information, number of occurrences of the information in web content, context of the information and so forth to identify data related to the input.

The computer system relates to at least one computing unit comprising a central storage system, processing units and various peripheral devices. Optionally, the computer system relates to an arrangement of interconnected computing units, wherein each computing unit in the computer system operates independently and may communicate with other external devices and other computing units in the computer system.

The term "system that identifies" is used interchangeably with the term "system for identifying", wherever appropriate i.e. whenever one such term is used it also encompasses the other term.

Throughout the present disclosure, the term "processing module" as used herein, relates to a computational element that is operable to respond to and process instructions. Optionally, the processing module includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term processing module may refer to one or more individual processors, processing devices and various elements associated with a processing device that may be shared by other processing devices. Additionally, the one or more individual processors, processing devices and elements are arranged in various architectures for responding to and processing the instructions.

Further, the processing module is communicably coupled to a database arrangement, wherein the database arrangement is operable to store the information related to the entity, the probability score of each of the probable associations of the entity, and the at least one association of the entity. In an example, the processing module is coupled to the database arrangement using a communication network. Examples of the communication network include, but are not limited to, a cellular network, short range radio (for example, such as Bluetooth®), Internet, a wireless local area network, and an Infrared Local Area Network, or any combination thereof.

The term "database arrangement" as used herein, relates to an organized body of digital information regardless of a manner in which the data or the organized body thereof is represented. Optionally, the database arrangement may be hardware, software, firmware and/or any combination thereof. For example, the organized body of digital information may be in a form of a table, a map, a grid, a packet, a datagram, a file, a document, a list or in any other form. The database arrangement includes any data storage software and system, such as, for example, a relational database like IBM DB2 and Oracle 9. Furthermore, the data storage software and system may include MongoDB, HBase, ElasticSearch, Neo4J, ArangoDB and so forth. Additionally, the database arrangement refers to a software program for creating and managing one or more databases. Optionally, the database arrangement may be operable to support relational operations, regardless of whether it enforces strict adherence to the relational model, as understood by those of ordinary skill in the art.

Throughout the present disclosure, the term "entity" relates to one or more individuals, group of individuals, organization, and so forth. For example, the entity may be one or more persons such as physician, researcher, marketing analyst, and so forth. Furthermore, the entity may be an organizations such as hospital, company, and so forth. Specifically, the entity may comprise an entity name and at least one entity attribute associated therewith. Therefore, the at least one association of an entity refers to information association with the entity (specifically, entity attributes thereof). In an example, an entity with entity name "Dr. John Smith" may comprise entity attributes such as "Department of Oncology", "St. Mary's Hospital", and "Harvard Medical School" associated therewith.

It will be appreciated that an entity may be related to a specific field of the industry. Specifically, the term "field" as used herein, refers to a domain or an area of expertise of an entity. In an example, the field may include, but not limited to, medicine, marketing, manufacturing, and so forth. Moreover, such an entity may be an expert in a specific field segment.

The method of identifying at least one association of the entity comprises receiving an input comprising data related to the entity. Furthermore, the processing module is operable to receive an input comprising data related to the entity.

Optionally, the input comprising data related to the entity includes at least one of: an entity name, a unique identification of the entity, an affiliation of the entity, a geographical location related to the entity. Specifically, the input may comprise data related to the entity at least partly therein.

In an example, the input comprising data related to the entity from the user may include entity name, such as 'John'. Alternatively, the input may include a unique identification information of an entity. The 'unique identification information' of the entity comprises a single data field of numeric, alphabetic, and alphanumeric characters assigned to an entity. For example, the unique identification information of the entity may be MR109.51534UK.

In another example, the input from the user may include entity name and a geographical location associated therewith. The term 'geographical location' as used herein, refers to a position on the Earth. Specifically, such a position may be a universal location address such as room, department, branch or office, official administrative place, lane, block, landmark, area, pin code, city, district, state, country, continent corresponding to locating such entity on a global world map. Moreover, geographical location includes latitude and longitude information corresponding to the workplace of an entity or a distance from a reference point, wherein the reference point may be located at a certain distance from such geographical location. For example, the input may be 'John' and 'St. Mary's Hospital, London'.

Optionally, the input comprising data related to the entity is provided by a user. More optionally, the input from the user may be obtained in a form of a text input. Furthermore, the processing module may be associated with a portable communication device like a smartphone, laptop, and so forth or a fixed communication device like a personal computer (PC) and so forth for receiving the input.

The method further comprises acquiring web content related to the received input from a plurality of data sources. Moreover, the processing module is operable to acquire web content related to the received input from the plurality of data sources. Specifically, the plurality of data sources comprise large volumes of data relating to a plurality of entities. Therefore, the web content acquired from the plurality of data sources is related to the data provided in the input. However, the acquired web content may comprise redundant and repetitive data. Moreover, the plurality of data sources includes publicly available internet sources such as blogs, news, collegiate repositories, government agency databases, social networking sites, market surveys and so forth.

In an example, the input received may comprise data, "John S. Clark", related to the entity, "John Sinclair Clark". Subsequently, the web content acquired from the plurality of data sources may comprise content related to a plurality of entities such as "John Smith Clark", "John Simon Clark", "John Sinclair Clark", "John Smith C." and so forth.

Optionally, acquiring web content from a plurality of data sources comprises crawling the plurality of data sources. More optionally, at least one crawler is operable to crawl the plurality of data sources to acquire the web content. Specifically, the at least one crawler is operable to systematically visit the publicly available internet sources and extract web content.

In an embodiment, the at least one crawler is implemented using a distributed architecture. Furthermore, when the crawling module is implemented in the distributed architecture, the programs (such as bots and/or web spiders) for browsing the plurality of data sources are configured to be hosted on one or more processing modules that are spatially separated from each other.

Optionally, the acquired web content may be in an unstructured form. The method further comprises storing such acquired web content in an unstructured form, within a data storage repository. Specifically, the data storage repository comprises data-records. The term 'data-records' refers to organized or unorganized information related to the entities. In an example, the information in the data-records may include data in form of tables, maps, grids, packets, files, documents, lists, and so forth.

Optionally, the method further comprises removing a first type of noise from the web content stored within the data storage repository, wherein the first type of noise corresponds to occurrence of irrelevant information within a plurality of documents related to the stored web content. Specifically, the processing module is operable to remove the first type of noise from the web content stored within the data storage repository. The term 'first type of noise' as used herein, refers to text data that occurs in the plurality of documents multiple times, wherein such text is not contextually relevant in distinguishing the content of documents properly. Specifically, first type of noise comprises similar words which occur frequently and may influence the end result of a search within the plurality of documents while acquiring web content from the plurality of data sources. For example, the first type of noise may comprise stop words (such as "a", "an", "the", "etc." and the like), key-field (such as a field that contains a unique value for each record, for example, Part Number, Account Number or Employee ID) values and other meta-information (such as document properties, and the like), boiler plate text (such as documents, forms, and the like), online advertisements, numbers (such as 0-9, and so forth), optical character recognition (such as "iiii . . . ", "xxxxxxxxxxxxxxxxxxxxx", random characters, non-words, and the like) errors that are the result of automatic OCR computer processes and so forth. Furthermore, the processing module is operable to remove the first type of noise from the acquired web content and provide a filtered text-only component from the plurality of document as the result, thereby completing the process of removing a first type of noise from the web content stored within the data storage repository.

Moreover, removing the first type of noise from the web content stored within the data storage repository is important in an aspect as it undesirably influences the context of the information within the plurality of documents. More specifically, the first type of noise may increase the distance between the occurrence of the entity name and the at least one association of the entity within the plurality of documents, wherein the increase in distance may correspond to the introduction of stop words, boiler plate content, advertisements, and so forth.

The method further comprises filtering the acquired web content to obtain information relating to the entity. Specifically, information relating to the entity comprise concise and accurate information about the entity of the input obtained after filtering the redundant information relating to the plurality of entities. Moreover, the filtering may be performed using the ontology.

In the aforementioned example, the input received may comprise data, "John S. Clark", related to the entity, "John Sinclair Clark". Subsequently, the web content acquired from the plurality of data sources may comprise content related to a plurality of entities such as "John Smith Clark", "John Simon Clark", "John Sinclair Clark", "John Smith C." and so forth. Moreover, filtering the web content comprise filtering the content related to the plurality of entities such as "John Smith Clark", "John Simon Clark", "John Smith C." and so forth, to obtain information relating to the entity "John Sinclair Clark".

Throughout the present disclosure, the term "ontology" relates to set of concepts (namely, information, ideas, data, semantic associations and so forth) that elaborate types and properties of the set of concepts and semantic associations established therebetween. Specifically, the ontology provides information on relations of certain concepts in a specific field to one or more concepts in other fields. Furthermore, the ontology provides a base for extracting contextually (namely, conceptually) relevant information pertaining to the specific field required by the user. Additionally, the ontology provides a structured, optimal and relevant set of concepts pertaining to the specific field required by the user. Moreover, developing the ontology provides significant outcome for conducting scientific research, academic studies, market analysis and so forth. Optionally, the ontology may include concepts in form of text, image, audio, video, or any combination thereof.

The method further comprises identifying probable associations of the entity from the web content, using the ontology. Furthermore, the processing module is operable to identify probable associations of the entity from the web content, using the ontology. More specifically, the ontology may enable the processing module to identify the information related to the entity of the user input and discard any unrelated information. In an example, the input may comprise, data "Julia Cox, Oncology", related to an entity "Julia Cox". In such example, the information may comprise information such as "Apollo Cancer Research Institute", "MD Anderson School of Cancer Studies" and "International School of Design and Architecture". Therefore, in such example, the processing module is operable to identify probable associations of the entity "Julia Cox" with information such as "Apollo Cancer Research Institute", "MD Anderson School of Cancer Studies", using ontology and data related to the entity.

According to an embodiment, the method further comprises identifying the information further comprises removing noise from the probable associations of the entity, wherein the second type of noise comprises redundant information relating to the entity. Specifically, the processing module is operable to remove noise from the probable associations of the entity. Specifically, the noise related to associations which are not relevant with respect to the entity. Referring to the aforementioned example, information such as the "International School of Design and Architecture" is considered as redundant information relating to the entity and is removed.

The method further comprises determining for each of the probable associations, at least one of: a recency attribute, a frequency attribute, a proximity attribute, and/or a semantics attribute. Furthermore, the processing module is operable to determine for each of the probable associations, at least one of: the recency attribute, the frequency attribute, the proximity attribute, and/or the semantics attribute. It will be appreciated that a given probable association relates to an information associated with the entity.

Throughout the present disclosure, the term "recency attribute" refers to the time of last update of information related to the entity. Furthermore, a first information with a recency attribute higher than a second information, indicates higher recency of the first information and thus, having a higher importance and credibility. Optionally, the recency attribute may be determined using a score on a scale of varying ranges, depending on type of the information.

Optionally, the recency attribute is determined based on at least one of: a time of latest update of the web content, and/or a time of latest crawling of the plurality of data sources to acquire the web content. More optionally, the processing module is operable to determine the recency attribute based on at least one of: a time of latest update of the web content, and/or a time of latest crawling of the plurality of data sources to acquire the web content. Specifically, the information related to the entity may be time-stamped. Consequently, time-stamps of the information may provide data related to the time of the latest update of the information in the web content. Moreover, the time of latest crawling of the plurality of data sources may be determined to determine the recency attribute.

Throughout the present disclosure, the term "frequency attribute" refers to the number of co-occurrence of an entity and at least one associations of an entity in the acquired web content. Specifically, a high frequency attribute of a given association of an information indicates a high probability of the information associated with the entity. Optionally, the frequency attribute is determined based on a number of co-occurrence of each of the probable associations and the entity, within a plurality of documents related to the acquired web content. Further, the processing module is operable to determine the frequency attribute based on a number of co-occurrence of each of the probable associations and the entity, within a plurality of documents related to the acquired web content. Specifically, the at least one crawler operable to crawl the plurality of data sources to extract plurality of documents. Furthermore, the probable associations are identified from the plurality of documents and, the frequency attribute is determined therefrom. Optionally, the frequency attribute may be determined using a score on a scale of varying ranges, depending on type of the information.

Throughout the present disclosure, the term "proximity attribute" refers to a distance between an entity and at least one associations of an entity in the acquired web content. Optionally, the proximity attribute is determined based on a closeness of occurrence of each of the probable associations and the entity, within the plurality of documents related to the acquired web content. Furthermore, the processing module is operable to determine the proximity attribute based on a closeness of occurrence of each of the probable associations and the entity, within the plurality of documents related to the acquired web content. Specifically, the processing module is operable to identify the distance based on a number of words between the entity and the information in a given association. Furthermore, a higher number of words between the entity and the information in a given association indicates a lower importance of the association. Optionally, the proximity attribute may be determined using a score on a scale of varying ranges, depending on type of the information.

Throughout the present disclosure, the term "semantics attribute" refers to context of at least one association of the entity. Furthermore, the semantics attribute is determined based on the ontology. Specifically, the semantic attribute may be determined based on the text occurring between the entity and at least one association of an entity. For example, the semantic attribute will have a high score if the text between 'John' and "St. Mary's Medical College and Hospital, London" is "has studied in", whereas the semantic attribute will have a low score if the text is "owns a coffee shop near". In an embodiment, the semantics attribute is determined based on a context of at least one term occurring between each of the probable associations and the entity, within a plurality of documents related to the acquired web content. Optionally, the processing module is operable to determine the semantics attribute based on a context of at least one term, occurring between each of the probable associations and the entity, within a plurality of documents related to the acquired web content. Optionally, the semantics attribute may be determined using a score on a scale of varying ranges, depending on type of the information.

The method further comprises determining a probability score for each of the probable associations of the entity, based on at least one of: the recency attribute, the frequency attribute, the proximity attribute, the semantics attribute. Furthermore, the processing module is operable to determining a probability score for each of the probable associations of the entity, based on at least one of: the recency attribute, the frequency attribute, the proximity attribute, the semantics attribute.

Throughout the present disclosure, the term "probability score" relates to a strength of the probable associations of the entity with the entity. Furthermore, the probability score relates to a probability of association of a given probable association of the entity. Specifically, the strength of the probable associations of the entity with the entity record may be determined based on at least one of the recency attribute, the frequency attribute, the proximity attribute, and/or the semantics attribute. More specifically, at least one of the latest updated information related to an entity, the higher number of co-occurrence of each of the probable associations and the entity, the higher closeness of occurrence of each of the probable associations and the entity and the relevant context of at least one terms occurring between each of the probable associations and the entity, within a plurality of documents, may provide a higher probability score. Furthermore, a higher number of similar attributes between information in at least one association and the entity may provide a higher probability score.

Moreover, the recency attribute, the frequency attribute, the proximity attribute, and the semantics attribute are associated with a numerical value, which is further used to make an association matrix. An association matrix comprises four columns corresponding to the recency attribute, the frequency attribute, the proximity attribute, and the semantics attribute, and an 'n' number of rows corresponding to the entities. It will be appreciated that the association matrix may comprise multiple associations, wherein the entity and at least one association of the entity are determined based on the probability score.

Optionally, another association matrix may comprise four columns corresponding to the recency attribute, the frequency attribute, the proximity attribute, and the semantics attribute, and an 'n' number of rows corresponding to the affiliated entities. In an example, the 'n' number of rows corresponding to the affiliated entities may include affiliations (or specialties) such as neurologist, dentist, general physician, cardiologist, and so forth to determine the probable associations of the entity and entity.

The method further comprises identifying the at least one association of the entity from the probable associations, wherein the at least one association corresponds to a highest probability score. Moreover, the processing module is operable to identify the at least one association of the entity from the probable associations, wherein the at least one association corresponds to a highest probability score. Specifically, at least one association with highest probability score indicate a highest probability of the at least one association from the probable associations having a relation with the entity.

Optionally, the method further comprises generating a timeline for the entity, based on the identified at least one association of the entity. More optionally, the processing module is operable to generate the timeline for the entity, based on the identified at least one association of the entity. Specifically, the timeline for the entity is generated based on the acquired web content related to the entity. As mentioned previously, each of the information related to the entity is time-stamped. Therefore, based on the time-stamps of the information in probable associations of the entity, the timeline of the entity is generated.

Optionally, the method further comprises receiving an input of a specific time period and modifying the timeline based on the received input of the specific time period. More optionally, the processing module is further operable to receive an input of a specific time period and modify the timeline based on the received input of the specific time period. Specifically, the input is provided by a user. More specifically, the user may provide the input of a given specific time period to retrieve the associations of the entity in the given specific time period. Consequently, the timeline of the entity is accordingly modified. Moreover, the input may comprise a specific time period from the user may include number of years of experience, educational qualification, and so forth.

Furthermore, there is disclosed a computer readable medium containing program instructions for execution on a computer system, which when executed by a computer, cause the computer to perform method steps for identifying at least one association of an entity. The method comprises the steps of receiving an input comprising data related to the entity; acquiring web content related to the received input from a plurality of data sources; filtering the acquired web content to obtain information relating to the entity; identifying probable associations of the entity from the information relating to the entity using an ontology; determining for each of the probable associations, at least one of: a recency attribute, a frequency attribute, a proximity attribute, a semantics attribute; determining a probability score for each of the probable associations of the entity, based on at least one of: the recency attribute, the frequency attribute, the proximity attribute, the semantics attribute; and identifying the at least one association of the entity from the probable associations, wherein the at least one association corresponds to a highest probability score.

Optionally, the computer readable medium comprises one of a floppy disk, a hard disk, a high capacity read only memory in the form of an optically read compact disk or CD-ROM, a DVD, a tape, a read only memory (ROM), and a random access memory (RAM).

DETAILED DESCRIPTION OF THE DRAWINGS

Figure 1:
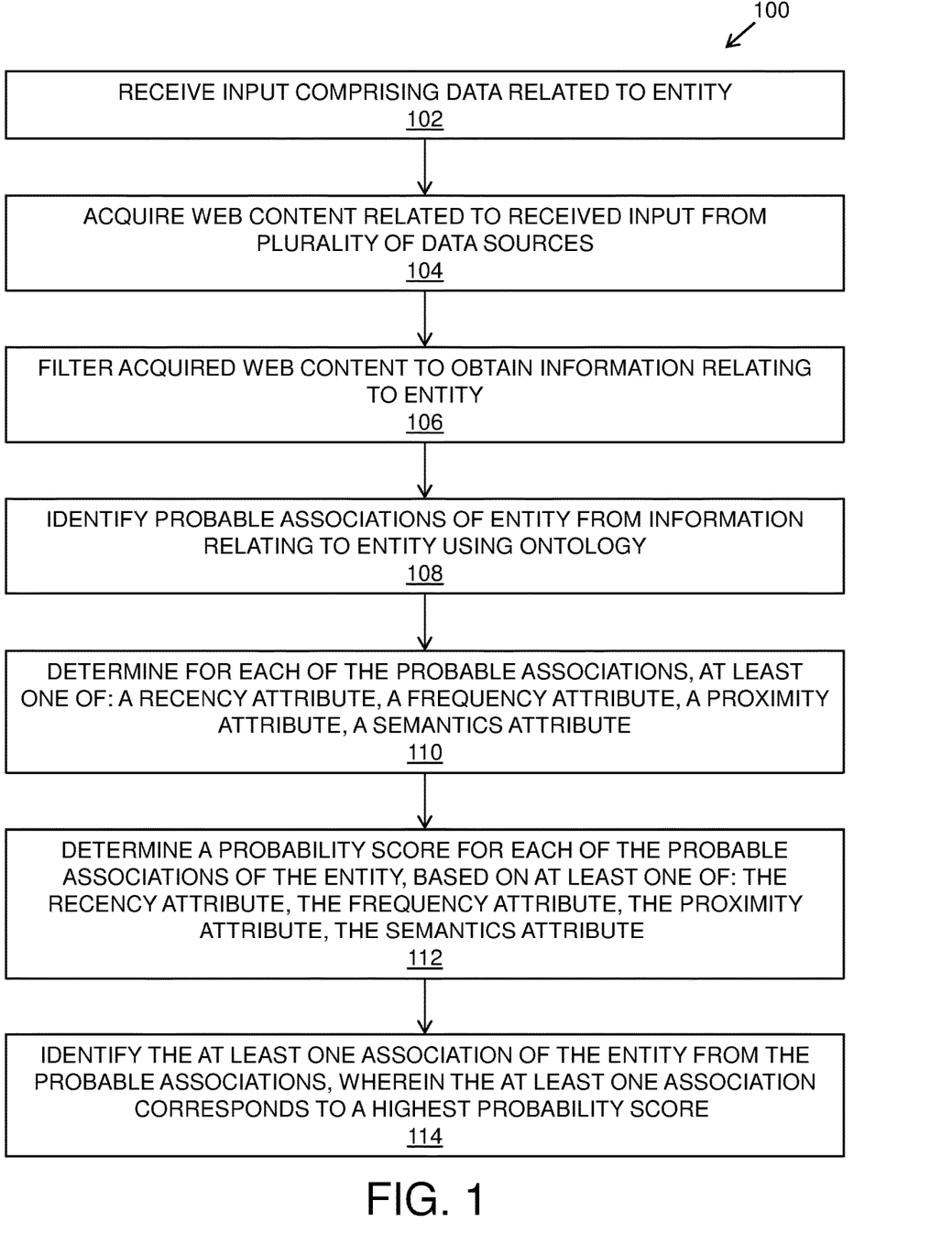
FIG. 1 is an illustration of steps of method of identifying at least one association of an entity, in accordance with an embodiment of the present disclosure.

Referring to FIG. 1, there is shown an illustration steps of a method 100 of identifying at least one association of an entity, in accordance with an embodiment of the present disclosure. At a step 102, an input comprising data related to the entity is received. At a step 104, web content related to the received input is acquired from a plurality of data sources. At a step 106, the acquired web content is filtered to obtain information relating to the entity. At step 108, probable associations of the entity are identified from the information relating to the entity using an ontology. At a step 110, at least one of: a recency attribute, a frequency attribute, a proximity attribute, a semantics attribute is determined for each of the probable associations. At a step 112, a probability score is determined for each of the probable associations of the entity, based on at least one of: the recency attribute, the frequency attribute, the proximity attribute, the semantics attribute. At a step 114, the at least one association of the entity is identified from the probable associations, wherein the at least one association corresponds to a highest probability score.

The steps 102 to 114 are only illustrative and other alternatives can also be provided where one or more steps are added, one or more steps are removed, or one or more steps are provided in a different sequence without departing from the scope of the claims herein.

Figure 2:
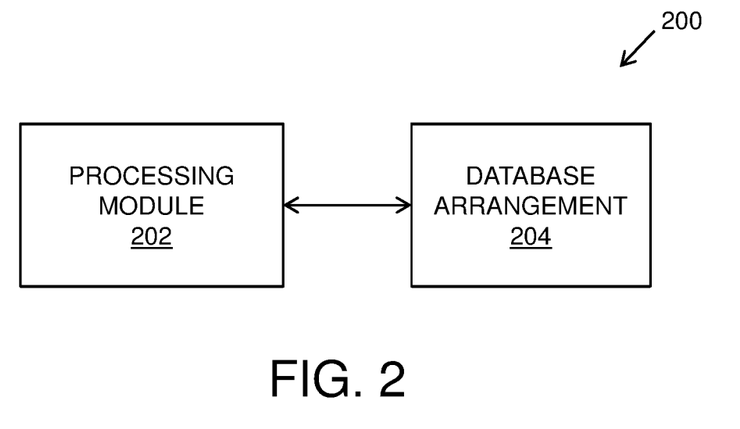
FIG. 2 is a block diagram of system that identifies at least one association of an entity, in accordance with an embodiment of the present disclosure.

Referring to FIG. 2, there is shown a block diagram of system 200 that identifies at least one association of an entity, in accordance with an embodiment of the present disclosure. The system 200 comprises a processing module 202 operable to receive an input comprising data related to the entity and identify at least one association of the entity. Furthermore, the system 200 comprises a database arrangement 204 communicably coupled to processing module 202. The database arrangement 204 is operable to store the data related to the entity, the probability score of each of the probable associations of the entity, and the at least one association of the entity.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for acquiring web content related to a received input comprising data related to an entity that includes at least one of: the entity name, a unique identification of the entity, an affiliation of the entity, and a geographical location related to the entity, from a plurality of data sources, that identifies at least one association of the entity for retrieval of contextually relevant associations of the entity, wherein the system comprises:
   at least one crawler configured to crawl the plurality of data sources for acquiring the web content, wherein the at least one crawler is configured to systematically visit publicly available internet sources and acquire the web content;
   wherein the at least one crawler is implemented using a distributed architecture;
   a memory and processor configured to:
      a) filter the acquired web content to obtain information relating to the entity by removing a first type of noise from the acquired web content, wherein the first type of noise is text that occurs in a plurality of documents multiple times, wherein such text is not contextually relevant in distinguishing a content of the plurality of documents;
      b) identify probable associations of the entity from the obtained information relating to the entity using an ontology, wherein the ontology is employed to extract contextually relevant information pertaining to a specific field related to the received input and discard any unrelated information, wherein the field relates to a domain or an area of expertise of the entity;
      c) determine for each of the probable associations, at least one of: a recency attribute, a frequency attribute, a proximity attribute, and a semantics attribute;
      d) determine a probability score for each of the probable associations of the entity, based on at least one of: the recency attribute, the frequency attribute, the proximity attribute, and the semantics attribute, wherein a higher number of similar attributes between information in the at least one association and the entity provide a higher probability score;
      e) create an association matrix using a numerical value associated with each of the recency attribute, the frequency attribute, the proximity attribute, and the semantics attribute of each of the probable associations, wherein the association matrix comprises multiple associations, wherein the entity and the at least one association of the entity in the association matrix are determined based on the probability score; and
      f) identify the at least one association of the entity from the probable associations, wherein the at least one association corresponds to a highest probability score, wherein the at least one association corresponding to the highest probability score indicates a highest probability of the at least one association from the probable associations having a relation with the entity; and
   a database communicably coupled to the processor, wherein the database is configured to store the data related to the entity, the probability score of each of the probable associations of the entity, and the at least one association of the entity.

2. The system of the claim 1, wherein the processor is configured to determine the recency attribute based on at least one of:
   a time of latest update of the web content; and
   a time of latest crawling of the plurality of data sources to acquire the web content.

3. The system of the claim 1, wherein the processor is configured to determine the frequency attribute based on a number of co-occurrences of each of the probable associations and the entity, within the plurality of documents related to the acquired web content.

4. The system of claim 1, wherein the processor is configured to determine the proximity attribute based on a closeness of occurrence of each of the probable associations and the entity, within the plurality of documents related to the acquired web content.

5. The system of claim 1, wherein the processor is configured to determine the semantics attribute based on a context of at least one term occurring between each of the probable associations and the entity, within the plurality of documents related to the acquired web content.

6. The system of claim 1, wherein the processor is configured to store the acquired web content in an unstructured form, within a data storage repository.

7. The system of claim 1, wherein the processor is further configured to generate a timeline for the entity based on the identified at least one association of the entity.

8. The system of claim 7, wherein the processor is further configured to receive an input of a specific time period and modify the timeline based on the received input of the specific time period.

9. A method of acquiring web content related to a received input comprising data related to an entity that includes at least one of: the entity name, a unique identification of the entity, an affiliation of the entity, and a geographical location related to the entity, from a plurality of data sources and identifying at least one association of the entity for retrieval of contextually relevant associations of the entity, wherein the method comprises:
   a) crawling the plurality of data sources to acquire the web content using at least one crawler implemented using a distributed architecture;
   b) filtering the acquired web content to obtain information relating to the entity by removing a first type of noise from the acquired web content, wherein the first type of noise is text that occurs in a plurality of documents multiple times, wherein such text is not contextually relevant in distinguishing a content of the plurality of documents;
   c) identifying probable associations of the entity from the obtained information relating to the entity using an ontology, wherein the ontology is employed to extract contextually relevant information pertaining to a specific field related to the received input and discard any unrelated information, wherein the field relates to a domain or an area of expertise of the entity;
   d) determining for each of the probable associations, at least one of: a recency attribute, a frequency attribute, a proximity attribute, and a semantics attribute;
   e) determining a probability score for each of the probable associations of the entity, based on at least one of: the recency attribute, the frequency attribute, the proximity attribute, and the semantics attribute, wherein a higher number of similar attributes between information in the at least one association and the entity provide a higher probability score;
   f) creating an association matrix using a numerical value associated with each of the recency attribute, the frequency attribute, the proximity attribute, and the semantics attribute of each of the probable associations, wherein the association matrix comprises multiple associations, wherein the entity and the at least one association of the entity in the association matrix are determined based on the probability score; and g) identifying the at least one association of the entity from the probable associations, wherein the at least one association corresponds to a highest probability score, wherein the at least one association corresponding to the highest probability score indicates a highest probability of the at least one association from the probable associations having a relation with the entity.

10. The method of claim 9, wherein the recency attribute is determined based on at least one of:

a time of latest update of the web content; and a time of latest crawling of the plurality of data sources to acquire the web content.

11. The method of claim 9, wherein the frequency attribute is determined based on a number of co-occurrences of each of the probable associations and the entity, within the plurality of documents related to the acquired web content.

12. The method of claim 9, wherein the proximity attribute is determined based on a closeness of occurrence of each of the probable associations and the entity, within the plurality of documents related to the acquired web content.

13. The method of claim 9, wherein the semantics attribute is determined based on a context of at least one term occurring between each of the probable associations and the entity, within the plurality of documents related to the acquired web content.

14. The method of claim 9, wherein the method further comprises storing the acquired web content in an unstructured form, within a data storage repository.

15. A non-transitory computer readable storage medium containing program instructions for execution on a computer system, which when executed by a computer, cause the computer to perform method steps for acquiring web content related to a received input comprising data related to an entity that includes at least one of: the entity name, a unique identification of the entity, an affiliation of the entity, and a geographical location related to the entity, from a plurality of data sources, and identifying at least one association of the entity for retrieval of contextually relevant associations of the entity, the method comprising:

a) crawling the plurality of data sources to acquire the web content using at least one crawler implemented using a distributed architecture;

b) filtering the acquired web content to obtain information relating to the entity by removing a first type of noise from the acquired web content, wherein the first type of noise is text that occurs in a plurality of documents multiple times, wherein such text is not contextually relevant in distinguishing a content of the plurality of documents;

c) identifying probable associations of the entity from the obtained information relating to the entity using an ontology wherein the ontology is employed to extract contextually relevant information pertaining to a specific field related to the received input and discard any unrelated information, wherein the field relates to a domain or an area of expertise of the entity;

d) determining for each of the probable associations, at least one of: a recency attribute, a frequency attribute, a proximity attribute, and a semantics attribute;

e) determining a probability score for each of the probable associations of the entity, based on at least one of: the recency attribute, the frequency attribute, the proximity attribute, and the semantics attribute, wherein a higher number of similar attributes between information in the at least one association and the entity provide a higher probability score;

f) creating an association matrix using a numerical value associated with each of the recency attribute, the frequency attribute, the proximity attribute, and the semantics attribute of each of the probable associations, wherein the association matrix comprises multiple associations, wherein the entity and the at least one association of the entity in the association matrix are determined based on the probability score; and g) identifying the at least one association of the entity from the probable associations, wherein the at least one association corresponds to a highest probability score, wherein the at least one association corresponding to the highest probability score indicates a highest probability of the at least one association from the probable associations having a relation with the entity.

* * * * *